United States Patent
Pavlyushchik et al.

(10) Patent No.: US 9,407,648 B1
(45) Date of Patent: Aug. 2, 2016

(54) SYSTEM AND METHOD FOR DETECTING MALICIOUS CODE IN RANDOM ACCESS MEMORY

(71) Applicant: Kaspersky Lab AO, Moscow (RU)

(72) Inventors: Mikhail A. Pavlyushchik, Moscow (RU); Alexey V. Monastyrsky, Moscow (RU); Denis A. Nazarov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/951,915

(22) Filed: Nov. 25, 2015

(30) Foreign Application Priority Data

Jun. 30, 2015 (RU) ................. 2015125972

(51) Int. Cl.
*H04L 29/06* (2006.01)

(52) U.S. Cl.
CPC ............ *H04L 63/1416* (2013.01); *H04L 63/20* (2013.01)

(58) Field of Classification Search
CPC ... H04L 63/10; H04L 63/1416; G06F 21/566; G06F 21/55; G06F 21/56; G06F 21/552; G06F 21/562; G06F 21/564; G06F 11/3604; G06F 12/14
See application file for complete search history.

(56) References Cited

U.S. PATENT DOCUMENTS

| | | | |
|---|---|---|---|
| 7,870,610 B1 * | 1/2011 | Mitchell | G06F 12/1441 726/22 |
| 8,065,567 B1 * | 11/2011 | Conover | G06F 21/566 714/38.1 |
| 8,099,785 B1 | 1/2012 | Pavlyushchik | |
| 8,612,995 B1 | 12/2013 | Yun | |
| 8,701,192 B1 * | 4/2014 | Glick | G06F 21/566 726/24 |
| 9,021,584 B2 | 4/2015 | Zaitsev | |
| 2004/0199763 A1 | 10/2004 | Freund | |
| 2006/0123430 A1 * | 6/2006 | Hunt | G06F 21/562 719/319 |
| 2006/0265749 A1 * | 11/2006 | Kwon | G06F 21/568 726/24 |
| 2008/0301051 A1 * | 12/2008 | Stahlberg | G06Q 20/40 705/44 |
| 2009/0049550 A1 * | 2/2009 | Shevchenko | G06F 21/56 726/23 |
| 2009/0083731 A1 * | 3/2009 | Sobel | G06F 21/577 717/177 |
| 2011/0083186 A1 * | 4/2011 | Niemela | G06F 21/566 726/24 |
| 2011/0179430 A1 * | 7/2011 | Kim | G06F 9/44521 719/331 |
| 2011/0271343 A1 * | 11/2011 | Kim | G06F 21/566 726/23 |
| 2012/0291131 A1 * | 11/2012 | Turkulainen | G06F 21/554 726/24 |
| 2013/0042294 A1 * | 2/2013 | Colvin | G06F 21/53 726/1 |

(Continued)

FOREIGN PATENT DOCUMENTS

| | | |
|---|---|---|
| RU | 2510530 C1 | 3/2014 |
| RU | 2514137 C1 | 4/2014 |
| RU | 2514140 C1 | 4/2014 |

*Primary Examiner* — Darren B Schwartz (74) *Attorney, Agent, or Firm* — Arent Fox LLP; Michael Fainberg (57) ABSTRACT

Disclosed are system and method for detecting malicious code in random access memory. An exemplary method comprises: detecting, by a hardware processor, a process of an untrusted program on the computer; identifying, by the hardware processor, function calls made by the process of the untrusted program, including inter-process function calls made by the process to a destination process; determining, by the hardware processor, whether to perform malware analysis of a code in an address space of the destination process that was subject of an inter-process function call made by the process of the untrusted program; and when it is determined to perform malware analysis, analyzing the code in an address space of the destination process that was subject of an inter-process function call made by the process of the untrusted program using antivirus software executable by the hardware processor.

20 Claims, 4 Drawing Sheets

(56) References Cited

U.S. PATENT DOCUMENTS

| | | | | |
|---|---|---|---|---|
| 2013/0219453 A1* | 8/2013 | Balinsky | ............... | G06F 21/554 726/1 |
| 2013/0276119 A1* | 10/2013 | Edwards | ............... | G06F 21/554 726/24 |
| 2014/0137184 A1* | 5/2014 | Russello | ................ | G06F 21/60 726/1 |
| 2014/0325650 A1* | 10/2014 | Pavlyushchik | ........ | G06F 21/566 726/23 |
| 2015/0013008 A1* | 1/2015 | Lukacs | ................... | G06F 21/53 726/24 |
| 2015/0339480 A1* | 11/2015 | Lutas | ..................... | G06F 21/56 726/22 |
| 2016/0042179 A1* | 2/2016 | Weingarten | ........... | G06F 21/566 726/23 |

* cited by examiner

SYSTEM AND METHOD FOR DETECTING MALICIOUS CODE IN RANDOM ACCESS MEMORY

CROSS-REFERENCE TO RELATED APPLICATIONS

This application claims benefit of priority under 35 U.S.C. 119(a)-(d) to a Russian Application No. 2015125972 filed on Jun. 30, 2015, which is incorporated by reference herein.

FIELD OF TECHNOLOGY

The present invention relates generally to the field of computer security, and, more specifically, systems and methods for detecting malicious code in random access memory.

BACKGROUND

The number of software applications is increasing with a tremendous pace. Among the diversity of applications there are many malicious programs (malware), which cause harm to the computer or the computer user, such as Internet worms, key loggers, and computer viruses. There are also many technologies for providing security to computers, such as antivirus software, which is designed to detect malicious programs, as well as restrict their operability (such as placing them in quarantine or completely removing them from the computer).

However, there are various methods used by the developers of malicious programs to hide the activity of the malware from the antivirus applications. Depending on the methods being used by the antivirus application for detection of malicious software, such as signature analysis (a technique of searching for correspondences between a given segment of the code of the program being analyzed and a known code, or signature, from a library of signatures of malicious programs), heuristic analysis (a technique involving emulating the execution of the program being analyzed, creating a log of calls for API functions and searching for data correspondences between the created log of calls for API functions and a library of emulations of malicious programs), or proactive analysis (a technique involving intercepting calls for API functions of a program being analyzed and being launched in the system, creating a log of calls for API functions and searching for data correspondences between the log created and a library of calls for API functions of malicious programs), the developers of malicious applications can use methods of anti-emulation (such as checking for values returned by functions whose emulation in all likelihood is not realized in an emulator, in order to detect the emulation of a code execution), root kits (malicious programs which hide their presence on the computing device, for example with the help of drivers), polymorphic malicious programs (malicious programs whose executable code changes during the time of its execution), and obfuscation of the application code (changing the code of a malicious program into a form which is able to operate, yet is difficult to analyze). In addition to the above-described approaches, which are aimed at counteracting the antivirus application (for example, counteracting the detection by the antivirus application), malicious software can apply the approach of executing malicious code (instructions) from the address space of trusted applications (applications known to not be malicious, and any activity of such applications is permitted by the antivirus application).

Various approaches are used to monitor the execution of malicious code from the address space of a trusted application, including approaches involving tracking of calls for various API functions used for the transfer of control or for access to the address space of processes in order to track the call for a malicious code or its writing into the address space of a trusted process.

Although the abovementioned approaches are aimed at solving certain problems in the area of detection of malicious code in the address space of a trusted process, they do not solve the problem effectively enough: the mentioned approaches either require the checking of a plurality of possible operations of access to third-party processes (including the operations being carried out by trusted processes), or they survey a limited group of situations for which it is necessary to check the address space of a process in order to reveal a malicious code. The present invention enables more effective solving of the problem of detecting malicious code in random access memory.

SUMMARY

Disclosed are system and method for detecting malicious code in random access memory. An exemplary method comprises: detecting, by a hardware processor, a process of an untrusted program on the computer; identifying, by the hardware processor, function calls made by the process of the untrusted program, including inter-process function calls made by the process to a destination process; determining, by the hardware processor, whether to perform malware analysis of a code in an address space of the destination process that was subject of an inter-process function call made by the process of the untrusted program; and when it is determined to perform malware analysis, analyzing the code in an address space of the destination process that was subject of an inter-process function call made by the process of the untrusted program using antivirus software executable by the hardware processor.

In one exemplary aspect, identifying function calls made by the detected process includes one or more of: determining an identifier of the destination process of the function call; determining a size of a memory block written to in the address space of the destination process; determining presence of a header of an executable file in the memory block; determining whether the destination process is a trusted process; and determining whether an inter-process function call transfers control over executable code of the destination process in the memory area dedicated to dynamic link libraries.

In one exemplary aspect, determining whether to perform malware analysis of the code in an address space of the destination process includes: collecting, by the hardware processor, information about the untrusted program; and applying heuristic rules to the information, collected within the process of identifying function calls and the collected information about the untrusted program to determine whether to perform malware analysis of the code in an address space of the destination process.

In one exemplary aspect, the collected information about the untrusted program includes at least one of (i) information about unique users of the untrusted program, (ii) time since the first known execution of the untrusted program by a user, (iii) name of the untrusted program and (iv) and location of the untrusted program within the storage device.

In one exemplary aspect, the method further comprises: when a malicious code is detected in the analyzed address space of the destination process, determining, by the antivirus software, system functions that can be executed by the malicious code by comparing addresses of functions called by the executable code and addresses of functions loaded in the address space of the destination process.

In one exemplary aspect, the method further comprises: generating, by the antivirus software, control rules for the untrusted program that prohibit the untrusted program to make calls of the system functions that can be executed by the detected malicious code.

In one exemplary aspect, the method further comprises: when a malicious code is detected in the analyzed address space of the destination process, designating, by the antivirus software, as untrusted a program, which corresponds to the destination process having malicious code in its address space.

In one exemplary aspect, the method further comprises: when a malicious code is detected in the analyzed address space of the destination process, determining, by the antivirus software, a URI used by the malicious code; and generating, by the antivirus software, an antivirus record containing at least a portion of the determined URI used by the malicious code.

An exemplary system for detection detecting malicious code in random access memory: a hardware processor configured to: detect a process of an untrusted program on the computer; identify function calls made by the process of the untrusted program, including inter-process function calls made by the process to a destination process; determine whether to perform malware analysis of a code in an address space of the destination process that was subject of an inter-process function call made by the process of the untrusted program; and when it is determined to perform malware analysis, analyze the code in an address space of the destination process that was subject of an inter-process function call made by the process of the untrusted program using antivirus software executable by the hardware processor.

An exemplary non-transitory computer readable medium storing computer executable instructions for detecting malicious code in random access memory, includes instructions for: detecting a process of an untrusted program on the computer; identifying function calls made by the process of the untrusted program, including inter-process function calls made by the process to a destination process; determining whether to perform malware analysis of a code in an address space of the destination process that was subject of an inter-process function call made by the process of the untrusted program; and when it is determined to perform malware analysis, analyzing the code in an address space of the destination process that was subject of an inter-process function call made by the process of the untrusted program using antivirus software.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION OF EXEMPLARY ASPECTS

Example aspects of the present invention are described herein in the context of a system, method, and computer program product for detecting malicious code in random access memory. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A malicious code (or program or application) may be computer instructions that cause harm to a computer or a computer user, such as an Internet worm, a key logger, or a computer virus. The harm caused may be unauthorized access to the computer resources, including data being stored on the computer, for the purpose of stealing it, as well as unauthorized use of resources, including those for data storage, performing calculations, and so on.

Signature analysis may be a technique of searching for matches between a given segment of the code of the program being analyzed and a known code, or signature, from a library of signatures of malicious programs for the purpose of detecting a malicious program. It should be noted that this technique can be used to detect both files of a malicious program and malicious code in the random access memory of a computing device.

The context of a function call may be the information about the function call, including at least the following call attributes: the name of the function, the values of the function operands (if the operand is an address in memory, the context may also include the data block in memory, such as one of 100 bytes, to which the corresponding operand of the function refers), the call address of the function (can be computed from the return address of the function), the identifier of the thread carrying out the call for the function (thread ID), the descriptor of the thread carrying out the call for the function (thread handle), and the descriptor of the process within which the call for the function will occur (process handle).

A trusted application may be an application which does not cause harm to the computing device or its user. One can consider a trusted application to be an application developed by a trusted software manufacturer, downloaded from a trusted source, or an application whose identifier (such as the MD5 of the application file) is stored in a library of trusted applications (the manufacturer's identifier, such as a certificate, may also be stored in the library of trusted applications).

An untrusted application may be an application, which is not trusted, but also not recognized as being malicious, for example, by using a security application.

An untrusted process may be a process started from an untrusted application.

Heuristic analysis may be a technique involving emulating the execution of a program being analyzed, creating a log of API function calls made by the program and searching for matches between the created log of API function calls and a library of function calls made by known malicious programs in order to determine whether the analyzed program is malicious.

Injected data may be data (including executable code consisting of instructions for the processor) written by one of the threads of one process into the address space of another process.

Data about an application may be the information describing the application (and also the processes started from that application), including executable files of the application and other components (e.g., multimedia resources, configuration files, and so on). Data about the application may also include at least the name of the application (and consequently the names of the processes created and run from the application), the startup directory of the process, the number of unique users having run the application, and the time elapsed since the first known execution of the application.

An interprocess communication function may be a system function (such as the Windows API function) used to execute code in an address space (occasionally called "from an address space") of another process (not the one from which the given function is called), such as CreateRemoteThread, SetThreadContext, NTQueueApcThread or ResumeRemoteThread, and also a function used to inject code which will be executed by another process (such as WriteProcessMemory). The target of an interprocess communication function call may be the process (target process), and the context of the interprocess communication function call will contain such values of the arguments that the writing of data (to be done, for example, with the function WriteProcessMemory) occurs in the address space of the target process, or transfer of control occurs to the executable code present in the address space of the process which is the target of the interprocess communication function call.

The functionality of a code may be the plurality of system calls which can be performed during the execution of the code.

Figure 1:
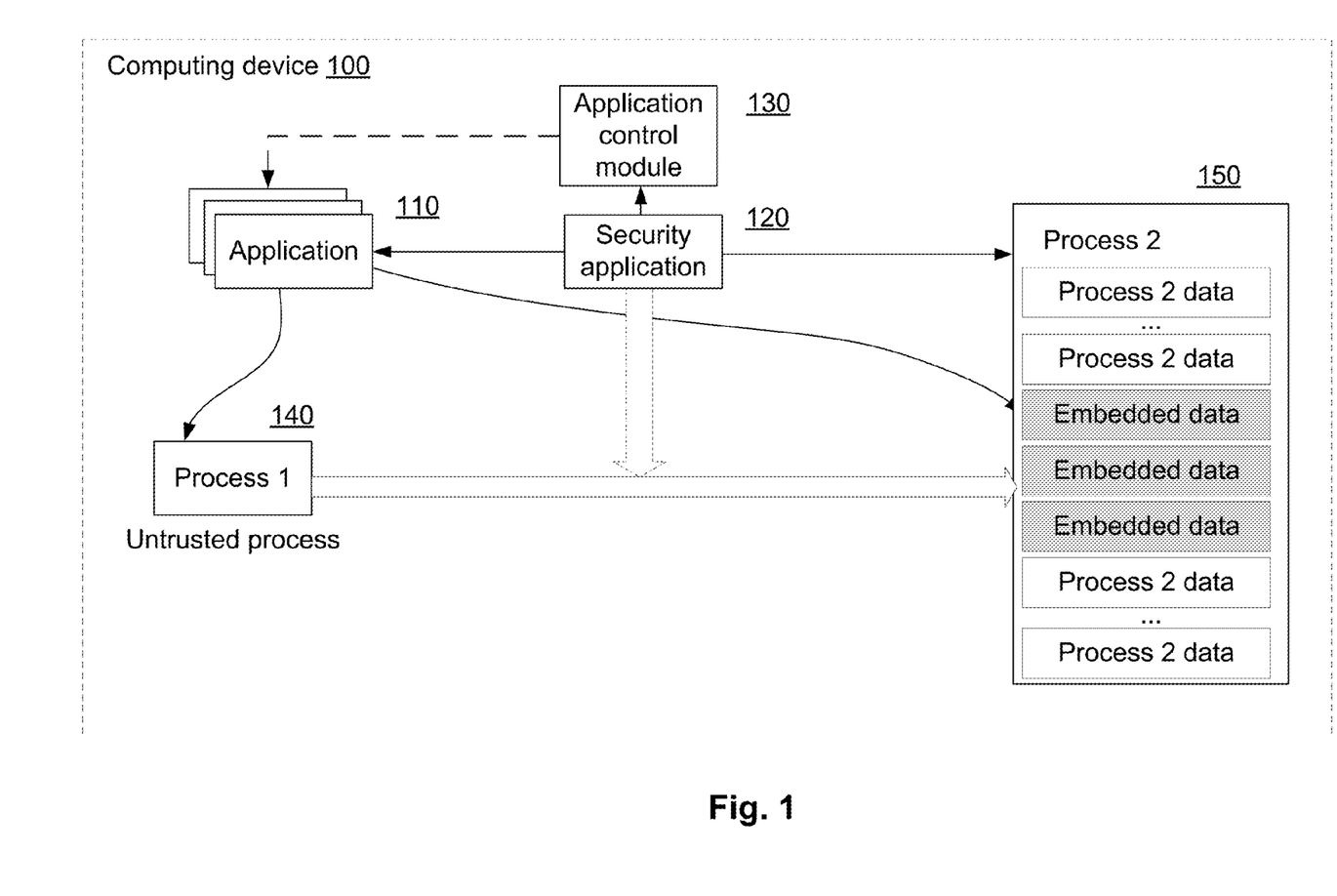
FIG. 1 illustrates a block diagram of an exemplary system for detection of malicious code in random access memory.

FIG. 1 illustrates an exemplary system for detection of malicious code in random access memory of a computing device. The computing device 100 shown schematically in FIG. 1, whose detailed diagram will be given in FIG. 3, may be a personal computer (for simplicity, a "computer"), a mobile computing device (such as a smartphone or a notebook), or also a distributed computer network consisting of the aforementioned devices. The computing device 100 may have at least one application 110 (a program or software) installed and running thereon. The application(s) 110 may be used by the user of the computing device 100, for example, to view web pages, listen to audio files, or interact with the Internet. In addition to the above-described application(s) 110, the computing device 100 may have installed thereon a security application 120 (such as an antivirus application), designed to protect the computing device 100 and its user against malicious programs. In order to perform the tasks of protecting the computing device 100, the security application 120 may include a number of modules (not shown), such as a signature analysis module, a heuristic analysis module, and a logging module.

In one exemplary aspect, the logging module is designed to intercept system calls, or calls for system functions (such as WinAPI functions), which are carried out by various processes on the computing device 100, and also to save the context of these function calls. For example, when using the operating system of the Windows family, the logging module intercepts function calls by installing a filter driver (a driver added to the stack of drivers for interaction with the device). To realize this approach, a filter manager may be used, in which the driver carrying out the functioning logic of the logging module is loaded.

In one exemplary aspect, the computing device 100 may also include an application control module 130. The application control module 130 is designed to control the starting and execution of the applications 110. In one exemplary aspect, the application control module 130 operates by rules ("application control rule" or "control rule") which govern its behavior in different situations (such as control of the actions of the aforementioned software). For example, such control rules may specify the operation of the module 130 upon starting and executing of the different applications 110, as well as applications from different groups. Application groups may include, but not limited to: trusted software, malicious software, untrusted software. In one exemplary aspect, the control rules may include, but not limited to: prevent the starting of malicious software; allow the starting of only trusted software (the default deny rule); and allow the starting of software not in the group of malicious software.

In one exemplary aspect, the security application 120 determines that a particular application 110 belongs to the group of untrusted applications if the application 110 has not been recognized by the security application 120 as being malicious in accordance with one of the methods of detecting malicious programs (e.g., signature or heuristic), and also the application 110 has not been recognized as being trusted. In turn, the application 110 is acknowledged as being trusted if the library of trusted applications, which may be present either as part of the security application 120 or on a remote security server (not shown in FIG. 1), contains the identifier of the application 110 (such as the check sum MD5).

In one example, process 1 140 may be a process created from an untrusted application. The security application 120 with the aid of the logging module intercepts the functions being called in the course of execution of process 1 140, including the interprocess communication functions. It should be noted that the security application 120 may be configured to intercept function calls of all the applications 110 (not just the untrusted ones). The security application 120 may be also configured to determine the context of the function call for the intercepted function calls (including those for the interprocess communication functions).

In addition to the context of the calls, the security application 120 may be configure to collect data about the applications 110 from which the processes calling for the intercepted functions were started. In one exemplary aspect, in order to obtain data about the applications 110 the security application 120 may connect the remote security server (not shown), which in response to the identifier of the application 110 transmitted by the security application 120 (such as the check sum MD5) may send to the security application 120 the following data about the application: information on the number of unique users having started the application, and the time elapsed since the first known starting of the application. In turn, in order for such information to be available on the security server, the security application 120 upon starting the applications 110 sends a corresponding message (along with the identifier of the application) to the security server. In one exemplary aspect, the data about the application 110 may include, but not limited to, the information about the location of the application 110 within the computing device (e.g., the path to the corresponding file of the application).

In one aspect, data on the applications 110 may be collected by the security application 120 up to the moment of detection of an untrusted process. In such a case, the security application 120 may, for example, collect the aforementioned data on each application 110 installed on the computing device in the background. In another aspect, the security application 120 may collect data about the application 110 after it is recognized as untrusted.

In addition to the aforementioned attributes of the call contained in the context of the calls, the security application 120 is able to determine additional call attributes for each intercepted function call (including the call for an interprocess communication function): the name of the target process (can be determined using the identifier of the target process as the argument of the function call); the size of the memory block being written into the address space of the target process; the presence of a header of the executable file (such as the PE header for the OS of the Windows family, the ELF header for the OS of the Unix family or the DEX headers for the OS Android) in the memory block (the data block being injected) being written into the address space of the target process (for example, for the OS of the Windows family it can be found by looking in the memory block for the structure of the PE header—the MZ signature—, the DOS header, and so on); whether the target process a trusted process; whether the interprocess communication function carrying out a transfer of control to executable code of the target process in an area reserved for the code of dynamic libraries.

In one exemplary aspect, the process 2 150 is a target process for the calls of interprocess communication functions, which are called from the address space of process 1 140. FIG. 1 shows an example of representation of the address space of process 2 150. As can be seen from FIG. 1, said address space contains data belonging to process 2 150, such as executable code; the heap memory region; the executable code of the libraries being used, and so on. This data is shown as "process 2 data". At the same time, the address space of process 2 150 can also contain "injected data", which is data written by process 1 140 into the address space of process 2 150 with the aid of interprocess communication functions.

Figure 2A:
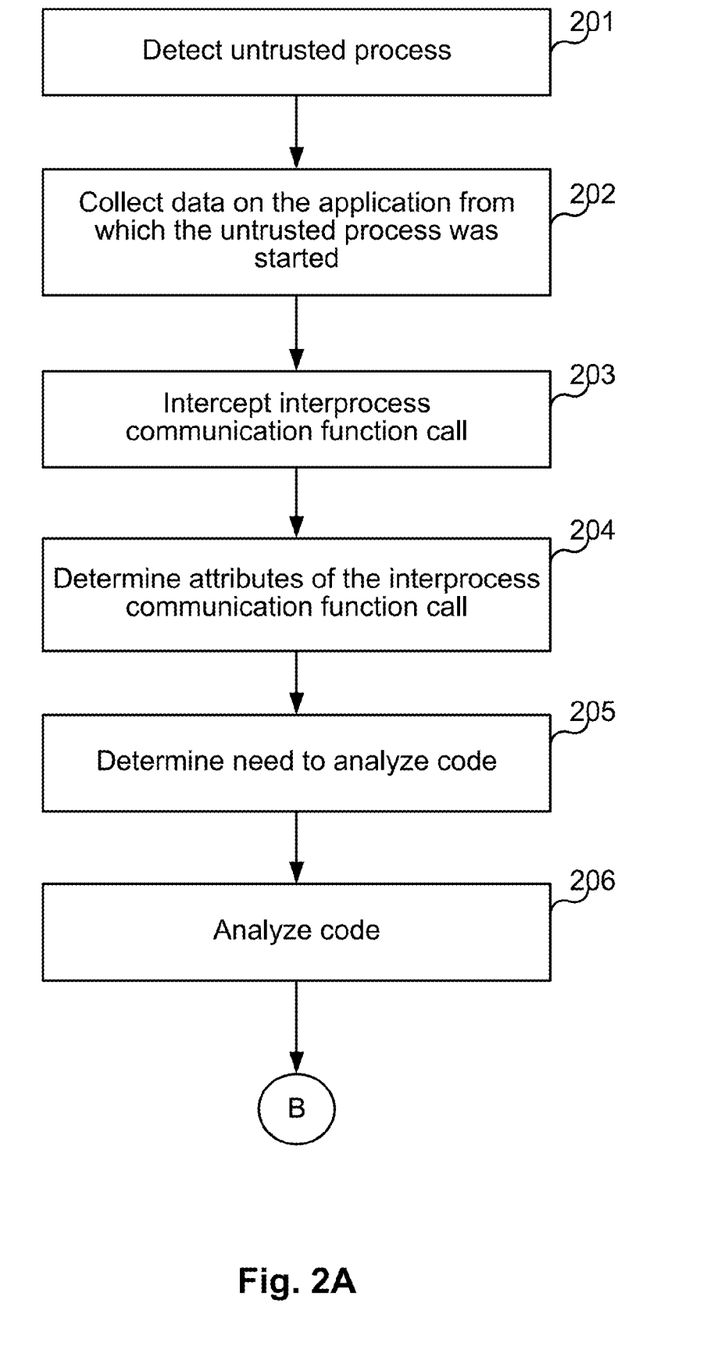
FIGS. 2A and 2B illustrate flow diagrams of an exemplary method of detection of malicious code in random access memory.
Figure 2B:
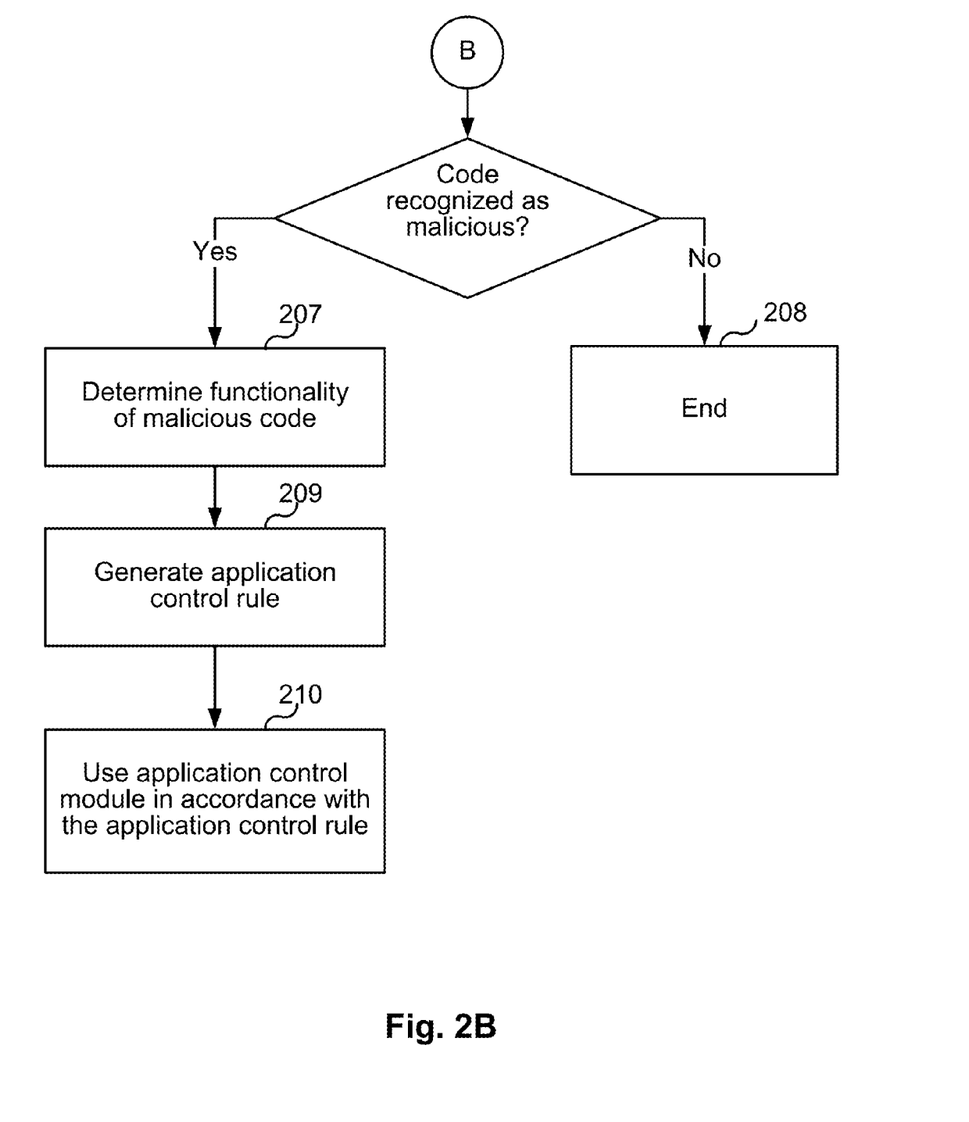

FIGS. 2A and 2B show an exemplary method of detection of malicious code in random access memory. In step 201, the security application 120 detects an untrusted process (the process 1 140) which has been started from one of the applications 110. In step 202, the security application 120 collects data about the application 110 (which is untrusted) from which the process 1 140 was started. Next, in step 203, the security application 120 with the aid of the logging module intercepts the call for at least one interprocess communication function from the address space of process 1 140, the target of the intercepted function call being process 2 150. In step 204, the security application 120 determines the attributes of at least one interprocess communication function call that was intercepted in the previous step. The interprocess communication function call indicates that the process 1 140 is either attempting to execute a certain code from the address space of process 2 150, or is injecting (writing) this executable code into the address space of process 2 150. In step 205, the security application 120 determines the need to analyze the code in the address space of the target process of the interprocess communication function call. In one exemplary aspect, code in the aforementioned memory region is an executable code. In yet another exemplary aspect, code in the aforementioned memory region is any binary data stored in memory.

The need to analyze the code in the memory region belonging to the target process (the code in the address space of the process which is the target of the interprocess communication function call) may be determined with the aid of heuristic rules, the applying of which to the data collected about the application 110 from which the untrusted process 1 140 was started, and also to the attributes of at least one interprocess communication function call, determines whether or not it is necessary to analyze the code in the address space of the target process. In one exemplary aspect, the aforementioned heuristic rules may be the following:

1. if a data block containing a PE-header is being written into the target process, the code must be analyzed;
2. if a process started from the directory "Application Data" (in the Windows OS the complete path of this directory is contained in the "APPDATA" environment variable) is injecting data in a trusted target process, the code must be analyzed;
3. if a process started from the "Temp" directory (in the Windows OS the complete path of this directory is contained in the "TEMP" environment variable) is injecting data in a trusted target process, the code must be analyzed;
4. if a process started from a directory corresponding to the desktop is injecting data in a trusted target process, the code must be analyzed;
5. if a process is injecting data in a trusted system process (such as those with names "svchost", "csrss", "winlogon", "rundll" or "iexplorer"), the code must be analyzed;
6. if a process is calling the function "NTQueueApcThread", while the arguments of the function refer to a trusted target process, the code must be analyzed;
7. if a process is injecting data in a target process, while the names of the process and the target process coincide, and the number of unique users having started the application from which the process was started does not exceed a threshold value (such as 50), and the time elapsed since the first known starting of the application from which the process was started does not exceed a threshold value (such as 1 day), the code must be analyzed.

It should be noted that rules 2, 3, and 4 can be combined into a single rule of "if a process started from a previously determined directory is injecting data in a trusted target process, the code must be analyzed". The fact that the process in which data is being injected is a trusted one follows from the fact that the application 110 from which it was started is a trusted one.

If a need to analyze the code was determined in accordance with one of the above-described heuristic rules in step 205, then in step 206 the security application 120 may perform an analysis of the code in the memory region belonging to the target process of the interprocess communication function call (the address space of the target process) in order to detect malicious code. In one exemplary aspect, known methods of code analysis can be used during this step, such as, for example, signature and/or heuristic analysis. If the code was not found to be malicious, the analysis ends in step 208.

But if malicious code was detected in step 206, then in step 207 the security application 120 makes a determination of the functionality of the code that was recognized as being malicious in step 206. In one exemplary aspect, the code functionality can be determined with the help of the security application 120 by comparing the addresses of the functions being called from the executable code and the addresses of the functions loaded in the address space of the process (in the context of the functionality of the code injected in the address space of the process, this means the libraries loaded into the address space of this same target process). Based on the results of the comparison, the security application 120 determines the code functionality—the collection of system functions which can be called from the code recognized as being malicious. In step 209, the security application 120 generates at least one application control rule for the application control module 130. In one exemplary aspect, the security application 120 generates an application control rule such that the calling for system functions which make up the functionality of the malicious code is forbidden for the application from which the target process was started. In yet another exemplary aspect, the security application 120 generates an application control rule whereby the application control module 130 requests user confirmation of system function calls making up the functionality of the malicious code for the application from which the target process was started. After generating the application control rule in step 209, the security application 120 sends said application control rule to the application control module 130, and in step 210 the application control module is used in accordance with the generated application control rule.

In one exemplary aspect, when malicious code is detected in step 206, the security application 120 may stop execution of the target process in whose address space the malicious code was injected. In yet another exemplary aspect, when malicious code is detected in step 206, the security application 120 may remove the malicious code from the address space of the target process. In another exemplary aspect, the security application 120 may remove or place in quarantine the application 110 from which the process performing the calls for the interprocess communication functions was started.

In one exemplary aspect, after detecting malicious code in step 206 the security application 120 may generate an application control rule for the application control module 130 whereby the application 110 from which the target process was started is placed by the application control module 130 on a list of untrusted ones (for example, by changing the record corresponding to the identifier of the application 110 in the library of trusted applications). As mentioned above, the application control module 130 is configured to control the starting and execution of applications 110, including untrusted ones. In one exemplary aspect, the application control module 130 may block the starting of untrusted applications. In yet another exemplary aspect, the application control module 130 may block all attempts to establish a connection with a remote resource (such as a site) until the user of the computing device 100 allows the establishing of such a connection.

In yet another exemplary aspect, after detecting malicious code in step 206 the security application 120 may determine at least one uniform resource identifier (URI) which is used by the malicious code. The detection (determination) of the URI may be performed by analyzing the address space of the process containing the malicious code. In one exemplary aspect, the security application 120 determines the URI by searching for possible string representations of the URI, such as the address of a remote resource "http://****.com/" or a resource within the file system "file://". In yet another exemplary aspect, the security application 120 may determine the address in the register of the operating system (such as for Windows OS) as the URI. In one exemplary aspect, the security application 120** may perform search for corresponding URIs by in the address space of the target process. In yet another exemplary aspect, the search may be done in the part of the address space not more than one particular byte value, such as not more than 1000 bytes, from the beginning of the malicious code. In yet another exemplary aspect, the search may be done within the proximity (such as 100 bytes) of the addresses which are used as the arguments of the instructions making up the malicious code. The resources includes objects which can be referred to by using URIs, such resources are: a file, a site, a register parameter, etc.

If a URI has been found, the security application 120 may generate a corresponding antivirus record to memorize the determined URI (or the hash, computed for example from the string representation of the URI). In turn, the antivirus record is used by the security application 120 such that the security application 120 may block (restrict) access from the computing device 100 to resources with the URI (or its hash) that is contained in the antivirus record. In one exemplary aspect, the security application 120 may send the created antivirus record to a remote security server, which in turn can distribute the antivirus record to many other computing devices that run the security application 120, for later use.

In one exemplary aspect, the security application 120 may generate antivirus records not for all URIs determined, but only for those which are absent from the library of trusted URIs, which may be part of the security application 120 and which contains a list of trusted URIs. The trusted URI includes a URI whose accessing will not cause harm (an example of harm might be the loading and/or starting of a malicious program, for example) to the computing device 100 or its user. In one exemplary aspect, the list of URIs stored in the library of trusted URIs may be generated on a remote security server, for example, with the help of a specialist in computer security, and sent to the security application 120 for later storage and use.

Figure 3:
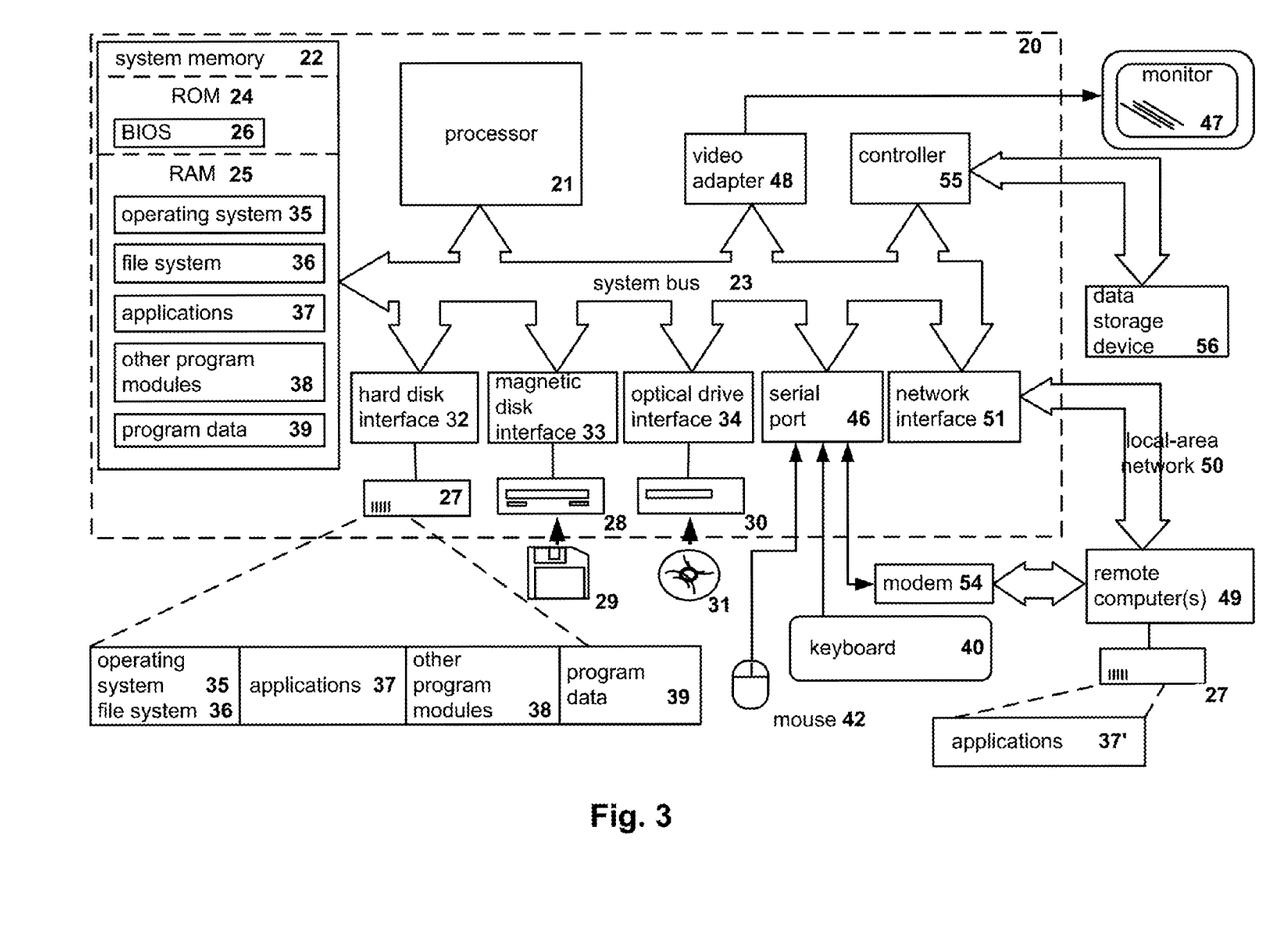
FIG. 3 illustrates an example of a general-purpose computer system by means of which the disclosed aspects of systems and method can be implemented.

FIG. 3 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 5. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detection of malware on a computer, the method comprising:
    detecting, by a hardware processor, a process of an untrusted program on the computer;
    identifying, by the hardware processor, function calls made by the process of the untrusted program, including inter-process function calls made by the process to a destination process;
    collecting, by the hardware processor, information about the untrusted program;
    applying, by the hardware processor, heuristic rules to information about the identified function calls and the information about the untrusted program to determine whether to perform malware analysis of a code in an address space of the destination process that was subject of an inter-process function call made by the process of the untrusted program; and
    when it is determined to perform malware analysis, analyzing the code in an address space of the destination process that was subject of the inter-process function call made by the process of the untrusted program using antivirus software executable by the hardware processor.

2. The method of claim 1, wherein identifying function calls made by the detected process includes one or more of:
    determining an identifier of the destination process of the function call;

determining a size of a memory block written to the address space of the destination process;
determining presence of a header of an executable file in the memory block;
determining whether the destination process is a trusted process; and
determining whether the inter-process function call transfers control over executable code of the destination process in the memory area dedicated to dynamic link libraries.

3. The method of claim 1, wherein the collected information about the untrusted program includes at least one of (i) information about unique users of the untrusted program, (ii) time since the first known execution of the untrusted program by a user, (iii) name of the untrusted program and (iv) and location of the untrusted program within the storage device.

4. The method of claim 1, further comprising: when a malicious code is detected in the analyzed address space of the destination process, determining, by the antivirus software, system functions that can be executed by the malicious code by comparing addresses of functions called by the executable code and addresses of functions loaded in the address space of the destination process.

5. The method of claim 4, further comprising: generating, by the antivirus software, control rules for the untrusted program that prohibit the untrusted program to make calls of the system functions that can be executed by the detected malicious code.

6. The method of claim 1, further comprising: when a malicious code is detected in the analyzed address space of the destination process, designating, by the antivirus software, as untrusted a program, which corresponds to the destination process having malicious code in its address space.

7. The method of claim 1, further comprising:
when a malicious code is detected in the analyzed address space of the destination process, determining, by the antivirus software, a URI used by the malicious code; and
generating, by the antivirus software, an antivirus record containing at least a portion of the determined URI used by the malicious code.

8. A system for detection of malware on a computer, the system comprising:
a hardware processor configured to:
detect a process of an untrusted program on the computer;
identify function calls made by the process of the untrusted program, including inter-process function calls made by the process to a destination process;
collect information about the untrusted program;
apply heuristic rules to information about the identified function calls and the information about the untrusted program to determine whether to perform malware analysis of a code in an address space of the destination process that was subject of an inter-process function call made by the process of the untrusted program; and
when it is determined to perform malware analysis, analyze the code in an address space of the destination process that was subject of the inter-process function call made by the process of the untrusted program using antivirus software executable by the hardware processor.

9. The system of claim 8, wherein identifying function calls made by the detected process includes one or more of:
determining an identifier of the destination process of the function call;
determining a size of a memory block written to the address space of the destination process;
determining presence of a header of an executable file in the memory block;
determining whether the destination process is a trusted process; and
determining whether the inter-process function call transfers control over executable code of the destination process in the memory area dedicated to dynamic link libraries.

10. The system of claim 8, wherein the collected information about the untrusted program includes at least one of (i) information about unique users of the untrusted program, (ii) time since the first known execution of the untrusted program by a user, (iii) name of the untrusted program and (iv) and location of the untrusted program within the storage device.

11. The system of claim 8, wherein the processor further configured to: when a malicious code is detected in the analyzed address space of the destination process, determining, by the antivirus software, system functions that can be executed by the malicious code by comparing addresses of functions called by the executable code and addresses of functions loaded in the address space of the destination process.

12. The system of claim 11, wherein the processor further configured to: generate, by the antivirus software, control rules for the untrusted program that prohibit the untrusted program to make calls of the system functions that can be executed by the detected malicious code.

13. The system of claim 8, wherein the processor further configured to: when a malicious code is detected in the analyzed address space of the destination process, designating, by the antivirus software, as untrusted a program which corresponds the destination process having malicious code in its address space.

14. The system of claim 8, wherein the processor further configured to:
when a malicious code is detected in the analyzed address space of the destination process, determining, by the antivirus software, a URI used by the malicious code; and
generating, by the antivirus software, an antivirus record containing at least a portion of the determined URI used by the malicious code.

15. A non-transitory computer readable medium storing computer executable instructions for detection of malware on a computer, including instructions for:
detecting a process of an untrusted program on the computer;
identifying function calls made by the process of the untrusted program, including inter-process function calls made by the process to a destination process;
collecting information about the untrusted program;
applying, by the hardware processor, heuristic rules to information about the identified function calls and the information about the untrusted program to determine whether to perform malware analysis of a code in an address space of the destination process that was subject of an inter-process function call made by the process of the untrusted program; and
when it is determined to perform malware analysis, analyzing the code in an address space of the destination process that was subject of the inter-process function call made by the process of the untrusted program using antivirus software.

16. The non-transitory computer readable medium of claim 15, wherein identifying function calls made by the detected process includes one or more of:
- determining an identifier of the destination process of the function call;
- determining a size of a memory block written to in the address space of the destination process;
- determining presence of a header of an executable file in the memory block;
- determining whether the destination process is a trusted process; and
- determining whether the inter-process function call transfers control over executable code of the destination process in the memory area dedicated to dynamic link libraries.

17. The non-transitory computer readable medium of claim 15, wherein the collected information about the untrusted program includes at least one of (i) information about unique users of the untrusted program, (ii) time since the first known execution of the untrusted program by a user, (iii) name of the untrusted program and (iv) and location of the untrusted program within the storage device.

18. The non-transitory computer readable medium of claim 15, further comprising instructions for: when a malicious code is detected in the analyzed address space of the destination process, determining, by the antivirus software, system functions that can be executed by the malicious code by comparing addresses of functions called by the executable code and addresses of functions loaded in the address space of the destination process.

19. The non-transitory computer readable medium of claim 15, further comprising instructions for: when a malicious code is detected in the analyzed address space of the destination process, designating, by the antivirus software, as untrusted a program, which corresponds to the destination process having malicious code in its address space.

20. The non-transitory computer readable medium of claim 15, further comprising instructions for:
- when a malicious code is detected in the analyzed address space of the destination process, determining, by the antivirus software, a URI used by the malicious code; and
- generating, by the antivirus software, an antivirus record containing at least a portion of the determined URI used by the malicious code.

* * * * *